Sept. 23, 1941.  B. CHADKIN  2,256,894
EASEL
Filed May 9, 1939  2 Sheets-Sheet 1
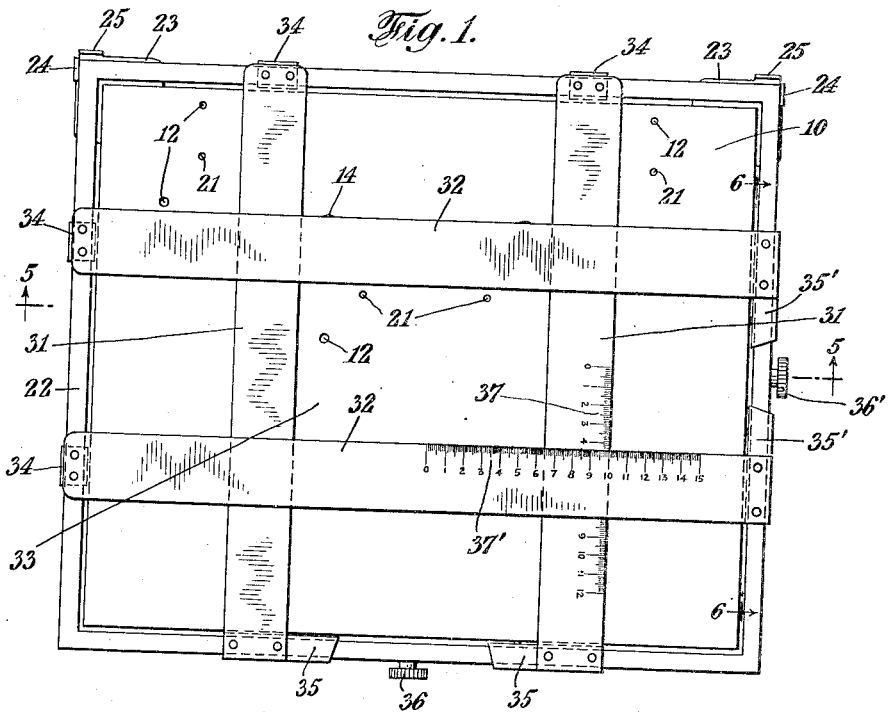
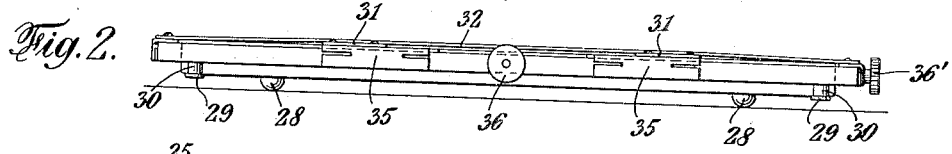
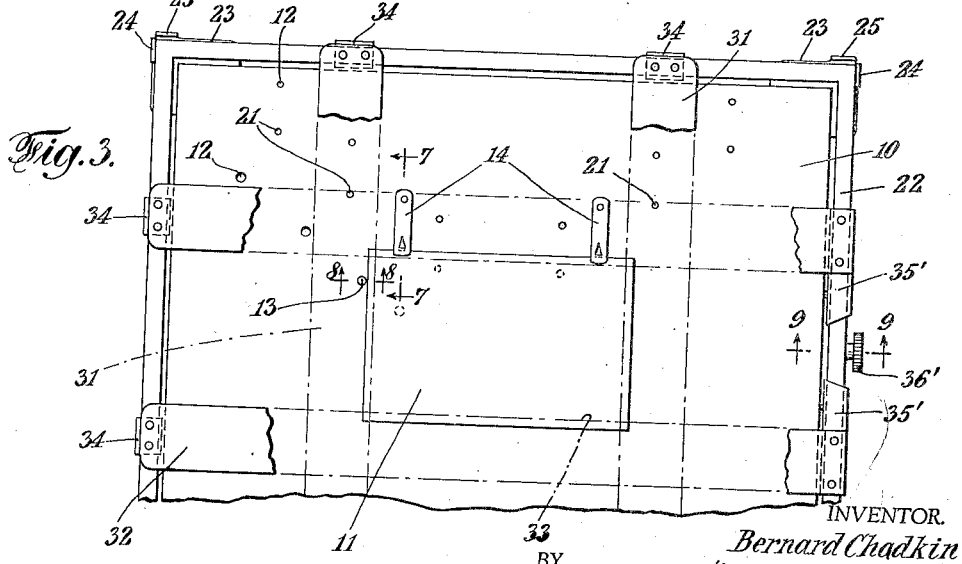
INVENTOR.
Bernard Chadkin
BY Peter M. Boesen
his ATTORNEY.

Sept. 23, 1941.  B. CHADKIN  2,256,894
EASEL
Filed May 9, 1939  2 Sheets-Sheet 2
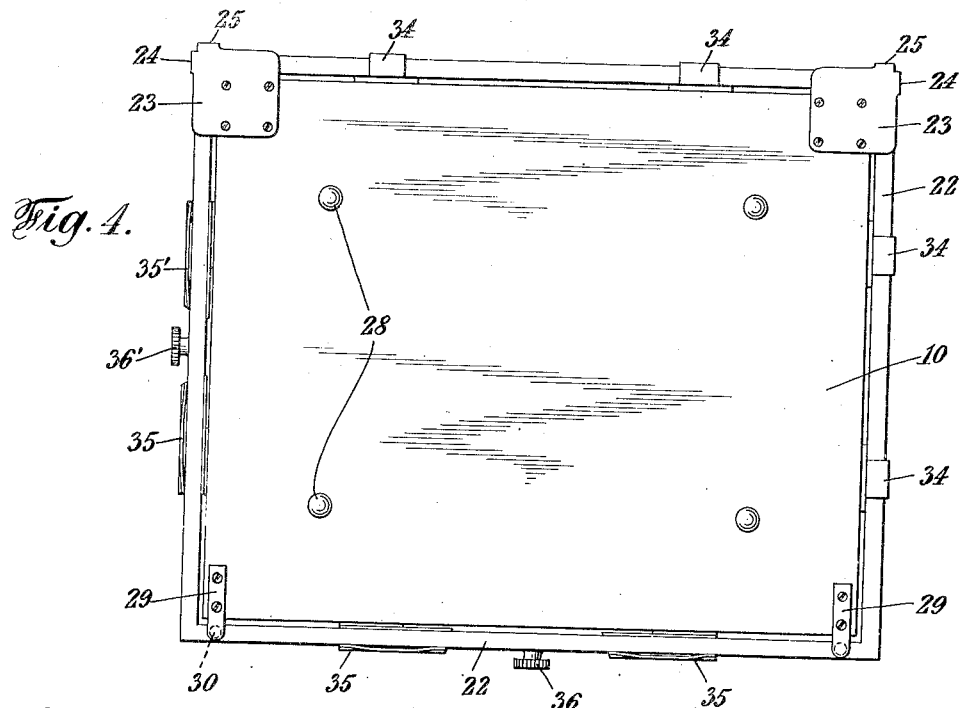
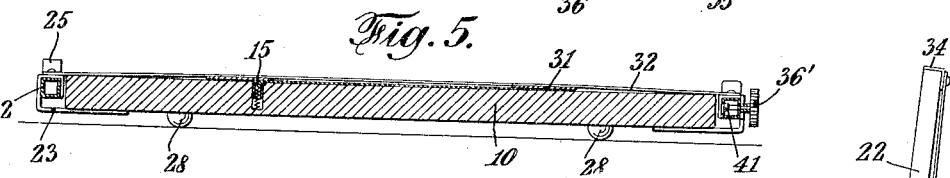
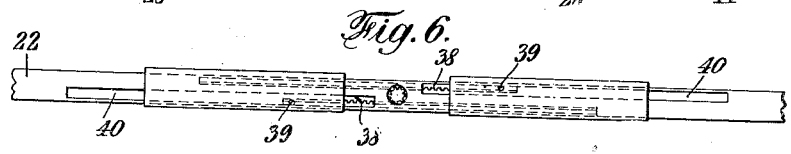
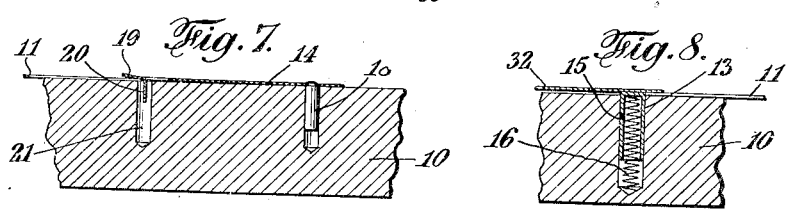
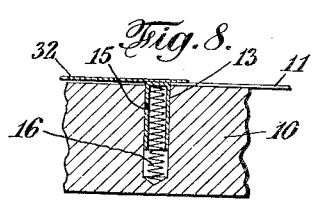
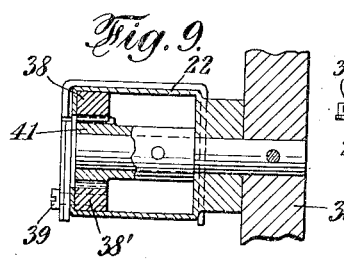
INVENTOR.
Bernard Chadkin
BY Peter M. Boesen
his ATTORNEY.

Patented Sept. 23, 1941

2,256,894

UNITED STATES PATENT OFFICE 2,256,894

EASEL

Bernard Chadkin, New York, N. Y.

Application May 9, 1939, Serial No. 272,732

3 Claims. (Cl. 88—24)

This invention relates to new and useful improvements in enlarging easels, as used in photographic enlargement of pictures, and the like; and the principles of my said device may in like manner be used for adjustable masks for various sizes of negatives in connection with the enlarger and/or contact printer.

The said device thus has for its purpose to provide an easel, which will be subject to automatical and perfect adjustment of the size of paper upon which the enlargement of a picture is to be made.

While the device, which comprises, in combination, a board and a frame system, is subject to automatical adjustment of the latter, said board, which may be made of any suitable material, has arranged thereon means for holding the paper securely in position, and it has further thereon means, whereby to accommodate in association with said first means, different sizes of papers upon which the enlargement is to be made.

The frame members, which carry indices thereon, may be quickly and automatically adjusted to the size of paper desired, with a positive contact of masking bands, assuring even, sharp and clean margins.

By operating the device, as described herein, the paper, or negative will be automatically centered.

The frame proper has means associated with the latter, relative to the board, so as to obtain a perfectly smooth movement of and noiseless closure of said frame upon the board.

With the above and other objects in view, this invention consists of the novel features of construction, combination and arrangement of parts, hereinafter fully described, claimed and illustrated in the accompanying drawings, forming part of this specification, and in which similar characters of reference indicate corresponding parts in all views, and in which:

Figure 1 is a top plan view of my invention.

Figure 2 is a side elevational view of the same.

Figure 3 is a top plan view of my invention, with parts broken off, and showing a paper securely arranged upon the board of the latter.

Figure 4 is a plan bottom view of my invention.

Figure 5 is a transverse sectional view taken on the line 5—5 in Figure 1; while Figure 6 is a detail view in elevation, taken on the line 6—6 in Figure 1, and showing the inner side of one of the side bars of the frame system.

Figure 7 is a detail view in section, taken on the line 7—7 in Figure 3, and showing one of the members for holding the paper in position.

Figure 8 is another detail sectional view, taken on the line 8—8 in Figure 3, and showing a movable stud, cooperating with the members, one of which is illustrated in Figure 7, and showing also the construction of said stud.

Figure 9 is a transverse sectional view taken on the line 9—9 in Figure 3; while Figure 10 is a side elevational view of my device in open position.

Referring more particularly to the drawings, 10 indicates a board member upon which a paper 11 for enlarging a picture is arranged, as shown in Figure 3; this board may be made in any shape and of any suitable material.

Said board member has its upper surface formed with a plurality of small holes 12 adapted to receive therein a movable stud 13, as shown in Figure 3, which stud serves the purpose, in combination with the fastening or securing means 14, the latter will be hereinafter more fully described, to align and hold the enlarging paper in proper position during the operating process.

The said stud 13, which is shown specifically in Figure 8, consists of a hollow cylindrical shell 15 of a size suitable for easy insertion into the holes 12; a coiled spring 16 is mounted in said shell and secured to the latter in any suitable manner; this spring, when not compressed, extends somewhat below the end of the shell, whereby to permit the latter to be submerged in said holes to the extent that the stud 13 will be substantially flush with the board, when one of the frame members 31 is lowered upon the latter if said stud is within the area of the frame member; said stud will then only project enough above the board to secure the arrest of the paper in the adjusted position. On account of the action of the spring the stud will rise again above the surface of the board, when the frame members are lifted from the latter.

The means for fastening the paper on the board consists of two springy clips 14, one of which has been shown especially in Figure 7; said clip 14 is secured to the board by means of a tiny bolt 18, while the other end of said clip terminates in a slightly upwardly bent portion 19 adapted to receive and hold the paper inserted underneath thereof; at the same time, said paper may only be inserted under said clip a definite and predetermined distance, as said paper will be automatically stopped by means of a downwardly projecting lug 20, stamped out of said clip and integral with the latter; said lug is made to slightly extend down into a small hole, as shown at 21 in said Figure 7.

It would thus appear that while the paper is definitely held by said clips, a great latitude as to the size of paper, which may be employed, is obtained by the manipulation of the stud 13 relative to the holes 12.

The frame system proper comprises the marginal frame 22, which is hollow and square in cross-section, said frame being made of any suitable metal.

A bracket 23 is attached underneath the board 10, as shown in Figure 4; said bracket has two vertical projections 24 and 25 bent thereon and integral therewith.

The frame 22 is hingedly connected to one of said vertical projections 24, as shown especially at 26 in Figure 10, while the other vertical projection 25, which forms an angle of 90 degrees with the first one, serves to securely hold and support the frame 22 in an upright position, when said frame is open during the operation of the device.

The board 10 is underneath provided with rubber feet 28; while two lugs 29 are secured underneath said board at the front thereof, as shown in Figure 4; said lugs are upon their upper surface provided with rubber cushioning means 30, shown in dotted lines in Figure 4, adapted to receive and support thereon the front edge of the frame 22, when the latter is closed upon the board.

Cross-wise arranged members 31 and 32, loosely overlapping each other, as shown especially in Figure 1, are slidably mounted upon the frame 22; said members 31 and 32 are adjustable with respect to each other in order to provide the right size, or space 33, as shown in Figure 1, for the exposure of the paper 11, shown in Figure 3, upon which the enlargement is to be made.

Said members 31 and 32 are rigidly secured to angularly bent slides 34, which partly surround the frame 22, enclosing the lower sides of the latter, on two sides of said frame. On the other two sides of the frame, said members 31 and 32 are slidably secured to the latter by means of elongated slides 35, 35 and 35', 35', as may be seen in Figure 4. Said latter slides, which operate on the principle of a rack and gear system, are manipulated by the knobs 36 and 36', respectively.

Thus by turning the knobs 36 and 36' the frame members 35, 35 and 35', 35' will move towards or away from each other, thereby adjusting the open space 33 through which the paper 11 for the enlargement, is to be seen.

The said adjustment will be made according to predetermined calculations by means of indices 37 and 37' arranged on top of the members 31 and 32.

The slide members 35, 35 and 35', 35', which are of uniform construction, each comprise two racks 38, 38', disposed within the frame 22, and which are secured to the said slide members by means of screws 39 upon the inner side of the frame, where said screws move in oblong slots 40, as shown especially in Figure 6, the gear 41 and the respective racks are, in turn, operated by means of the knobs 36 and 36', respectively.

What I claim as new, and desire to secure by Letters Patent of the United States, is:

1. In a device of the class described, in combination, a board member, springy clasps arranged upon the latter and adapted to engage a sheet of paper, each of said clasps having one end thereof fastened to the board member, a tongue formed upon the other end of said clasp and being adapted to secure and regulate the insertion of said sheet of paper with respect to said clasps, said board member being formed with a plurality of holes therein, a stud adapted for insertion in said holes and being adapted for cooperation with said clasps in securing the sheet of paper in a selected position, a marginal frame hingedly connected to the board member, crosswise arranged members loosely overlapping each other and extending from one frame edge to the other, elongated slide members slidably secured to the crosswise arranged members, each of said slide members comprising a rack disposed within the marginal frame, the latter being formed with oblong slots therein, and screws adapted to move in said slots, securing said racks to the slide members, and means extending through the marginal frame for actuating said racks.

2. In a device of the class described, in combination, a board member, means for adjustably securing a sheet of paper upon the latter, a marginal frame hingedly connected to the board member, crosswise arranged members loosely overlapping each other and extending from one frame edge to the other, elongated slide members slidably secured to the crosswise arranged members, each of said slide members comprising a rack disposed within the marginal frame, the latter being formed with oblong slots therein, and screws adapted to move in said slots, securing said racks to the slide members, and means extending through the marginal frame for actuating said racks.

3. In a device of the class described, in combination, a board member, a bracket formed with two vertical projections and being fixedly secured to the board, a marginal frame hingedly connected to one of said projections, the other one of said projections being adapted to secure the marginal frame in an upright position, crosswise arranged members loosely overlapping each other and extending from one frame edge to the other, angularly bent slides rigidly secured to the crosswise members and engaging two sides of the marginal frame, elongated slides rigidly secured to said crosswise members connecting the latter slidably to the marginal frame, each of said elongated slide members comprising a rack disposed within the marginal frame, the latter being formed with oblong slots therein, and screws adapted to move in said slots, securing said racks to the elongated slide members, and means extending through the marginal frame for actuating said racks.

BERNARD CHADKIN.